(12) United States Patent
Brown et al.

(10) Patent No.: US 7,681,355 B2
(45) Date of Patent: Mar. 23, 2010

(54) TREE LIMB SUPPORT DEVICE

(76) Inventors: Raymond Brown, 212 Sandalwood Ct., Vacaville, CA (US) 95687; Rose Brown, 212 Sandalwood Ct., Vacaville, CA (US) 95687; Diane Boudreau, 300 Plum St., Vacaville, CA (US) 95688

( * ) Notice: Subject to any disclaimer, the term of this patent is extended or adjusted under 35 U.S.C. 154(b) by 55 days.

(21) Appl. No.: 11/900,789

(22) Filed: Sep. 12, 2007

(65) Prior Publication Data

US 2009/0064572 A1 Mar. 12, 2009

(51) Int. Cl.
*A01G 17/06* (2006.01)
*A01G 17/14* (2006.01)
*A47F 5/00* (2006.01)
*A47F 7/00* (2006.01)
*F16M 7/00* (2006.01)
*F16M 13/00* (2006.01)

(52) U.S. Cl. ........................... 47/47; 248/125.8
(58) Field of Classification Search ............... 47/42, 47/43, 44, 47; 248/125.8, 130, 144, 170
See application file for complete search history.

(56) References Cited

U.S. PATENT DOCUMENTS

| | | | | |
|---|---|---|---|---|
| 2,007,606 A | * | 7/1935 | Jencick | 47/42 |
| 3,007,581 A | * | 11/1961 | Moore | 211/64 |
| 3,961,176 A | * | 6/1976 | Gleason | 362/413 |
| 5,568,700 A | * | 10/1996 | Veneziano et al. | 47/43 |

OTHER PUBLICATIONS www.propacrop.com.

* cited by examiner

*Primary Examiner*—Michael R Mansen
*Assistant Examiner*—Monica L Williams

(57) ABSTRACT

A device for supporting a tree limb. The device includes a base having top and bottom surfaces for situating the device proximate to said tree limb. A telescoping pole having a longitudinal axis and first and second ends is provided, the first end being rotatably secured to the base. A coupling is included for varying the length of the telescoping pole. A support rod is affixed to the second end of the telescoping pole, the support rod being rotatable about the longitudinal axis. A U-shaped limb support member is fixedly appended to the support rod.

3 Claims, 2 Drawing Sheets

TREE LIMB SUPPORT DEVICE

TECHNICAL FIELD

The present invention is directed to a device for supporting a tree limb capable of being situated to enable it to appropriately engage the tree limb for proper support.

BACKGROUND OF THE INVENTION

As trees age, oftentimes, their branches become less healthy and vigorous and, without suitable intervention, oftentimes would break away from the main trunk of the tree. This can also occur with healthy branches that may be unduly stressed by weight. For example, as fruit develops on the branches of a fruit bearing tree stress is created that the branch or limb must support.

There are many reasons why one may wish to save a tree limb under distress rather than to simply remove it from the main trunk system. If the limb is fruit bearing, the distress would be removed once the fruit is harvested. Even in situations where a limb is less than vigorous, it is oftentimes desirable to save it rather than to prune or remove it. For example, such a limb could aesthetically add to the visual appearance of a tree or provide shade or privacy which the tree owner would wish to maintain if at all possible.

A number of prior techniques have been employed in attempts to save distressed limbs. It is not uncommon to see braided wire fixed between the limb and load bearing trunk portions of the tree which, although are functional, further provide distress as such braided wire is generally screwed into the bark and limb of the trunk. Further, such guide wires are often unsightly and prove to be aesthetically detracting from the tree's overall appearance in many instances.

It is also oftentimes desirable to provide a limb support system on a temporary basis only to be removed once distress is no longer placed upon the limb. For example, when the tree is fruit bearing, once the fruit is harvested, there is oftentimes not a need to continue supporting the limb, at least until fruit reemerges in the following growing season.

It is thus an object of the present invention to provide a device capable of supporting a limb of a tree.

It is yet a further object of the present invention to provide a device for supporting a limb without involving the trunk or bark portion of the tree and without fixing the support device permanently proximate the distressed limb.

It is yet a further object of the present invention to provide a limb supporting device capable of being adjustable in height and capable of residing upon uneven terrain to enable the device to function appropriately proximate a distressed limb regardless of surrounding conditions.

These and further objects will be more readily apparent when considering the following disclosure and appended claims.

SUMMARY OF THE INVENTION

A device for supporting a tree limb, said device comprising a base having top and bottom surfaces for situating said device proximate said tree limb. A telescoping pole is provided having a longitudinal axis and first and second ends, said first end being rotatably secured to said base. A coupling is used for varying the length of said telescoping pole and a support rod is affixed to the second end of said telescoping pole, said support rod being rotatable about said longitudinal axis. Finally, a U-shaped limb support member fixedly appended to said support rod.

DETAILED DESCRIPTION OF THE INVENTION

Figure 1:
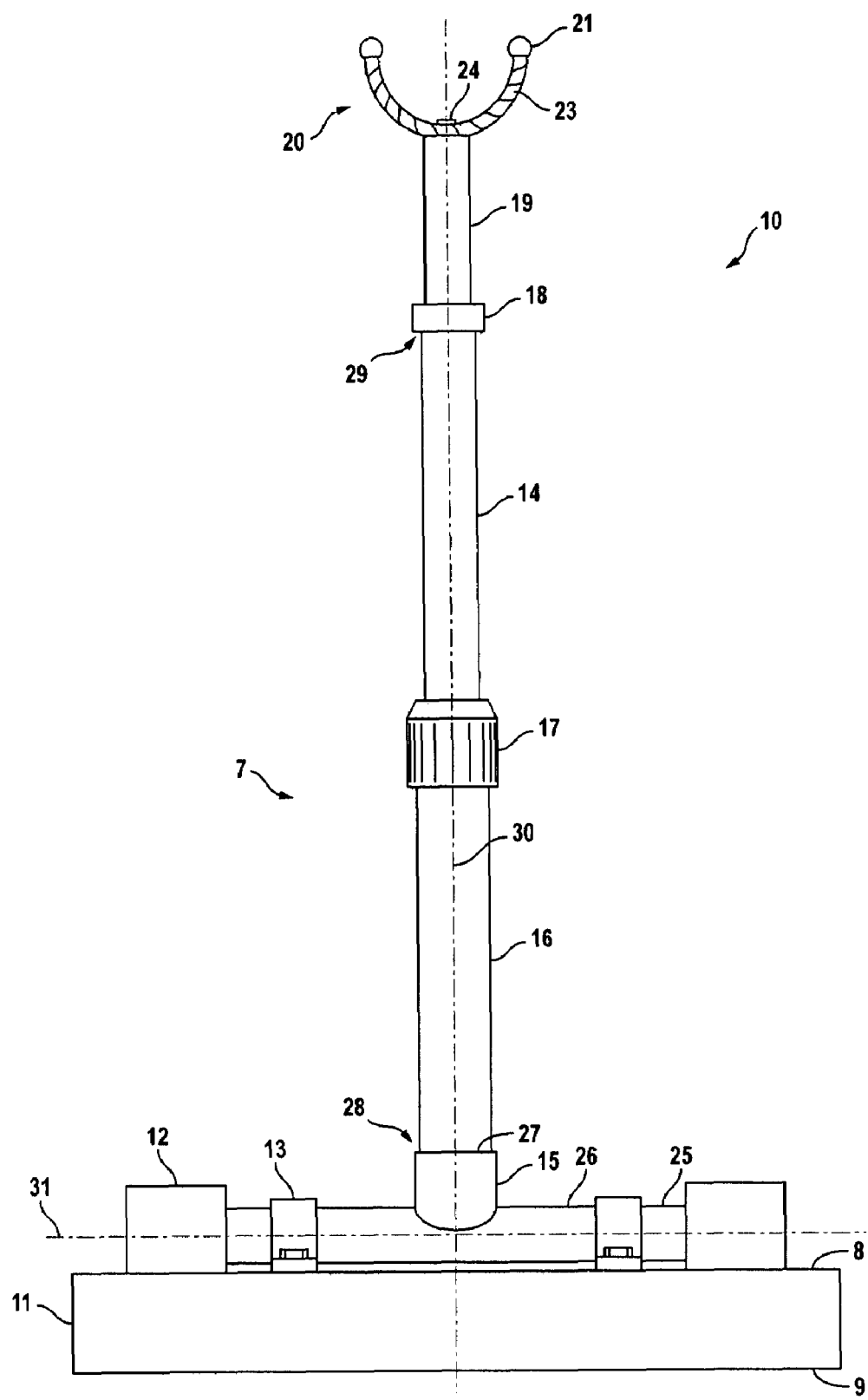
FIG. 1 is a front plan view of the tree limb support device of the present invention.
Figure 2:
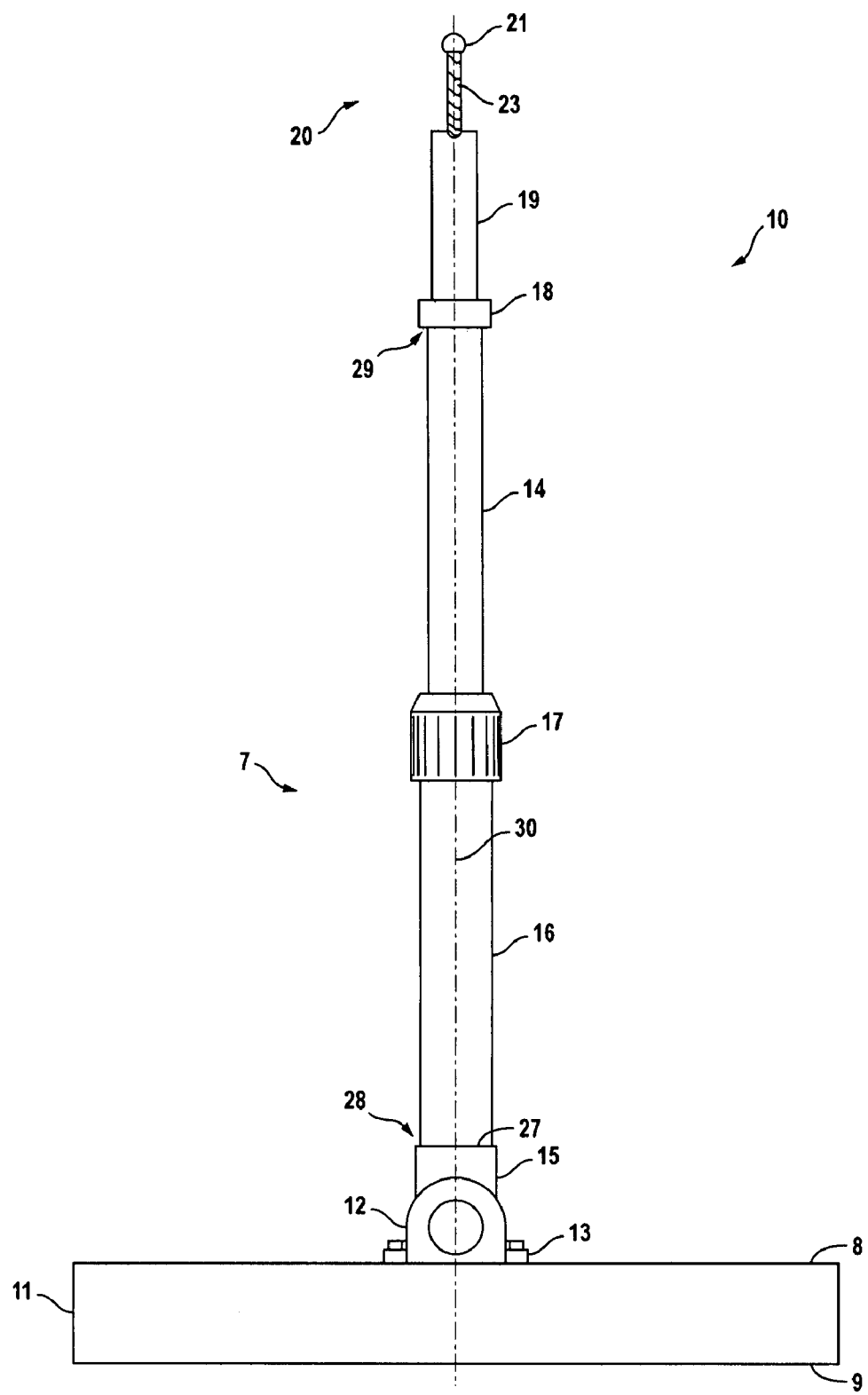
FIG. 2 is a side plan view of the tree limb support device of the present invention.

Turning to FIG. 1, tree limb support device 10 is depicted. The side view of the illustration of FIG. 1 is also referred to as FIG. 2 noting that like reference numerals identify corresponding elements of each figure.

The present device is intended to reside upon the ground approximate a tree trunk and positioned to support a distressed tree limb. As such, base 11, having top surface 8 and bottom surface 9, the latter to reside upon the ground, constitute a suitable footprint to stabilize the remaining component of the device during use. Because the ground upon which base 11 is to reside is oftentimes uneven, it is contemplated that the telescoping pole 7 having longitudinal axis 30 be rotatably secured to base 11 on top surface 8.

Base 11 is provided with retaining sleeves 12 and clamp members 13 supporting shaft 25 on either side of longitudinal axis 30. T-shaped sleeve 15 is provided with horizontally extending tubular member 26 for receiving shaft 25 and vertically extending tubular member 27 for receiving the first end 28 of telescoping shaft 7. In operation, horizontally extending tubular member 26 is sized with respect to shaft 25 to enable T-shaped support sleeve 15 to rotate about axis 31. As such, if bottom surface 9 of base 11 resides upon sloping or uneven ground adjacent the tree limb to be supported, axis 30 can remain vertically extended and adjustable to optimize its engagement with the distressed limb.

Recognizing that limbs to be supported are of varying heights from ground level, telescoping shaft 7 is intended to be capable of varying its length along longitudinal axis 30. This can ideally be done by providing first and second members 14 and 16 with first member 14 being slidably received within second member 16. To maintain a preselected length, locking collar 17 can be provided which releases locking engagement when turned counter clockwise but which locks first member 14 within second member 16 when rotated in a clockwise direction.

It is further noted that support rod 19 is appended to second end 29 of telescoping rod 7 through collar 18. In turn, U-shaped limb support member 20 is affixed to support rod 19 using carriage bolt 24. Although U-shaped limb support member 20 is rigidly affixed to support rod 19, the entire assembly can be rotated around longitudinal axis 30 by virtue of the rotation capability of support rod 19 vis-à-vis telescoping shaft 7 by virtue of collar 18.

U-shaped limb supporting member 20 is intended to cradle a tree limb. In order to cushion such contact, membrane 23 such as a plastic or rubber sleeve can reside about a rigid core, such as a U-shaped bent metal member (not shown). The ends of this rigid core can also be cushioned by virtue of rubber or plastic end caps 21.

In operation, a user would place base 11 proximate the trunk of a tree having a distressed limb requiring support. Due to the capability of rotating T-shaped support sleeve about axis 31, bottom surface 9 of base 11 can be placed upon an uneven surface. Collar 17 would then be loosened enabling an adjustment in length of telescoping pole 7 by sliding first member 14 in or out of second member 16 until U-shaped limb support member makes suitable contact with the limb. Thereupon, collar 17 is tightened whereby U-shaped support member can be properly adjusted to provide maximum cushioning support to the limb as support rod 19 rotates about longitudinal axis 30.

What is claimed is:

1. A device for supporting a tree limb, said device comprising a base having top and bottom surfaces for situating the device proximate said tree limb, a telescoping pole having a longitudinal axis and first and second ends, said first end being rotatably secured to said base such that said telescoping pole freely pivots with respect to said base, a coupling for varying the length of said telescoping pole, a support rod affixed to the second end of said telescoping pole, said support rod being rotatable about said longitudinal axis and a U-shaped limb support member fixedly appended to said support rod.

2. The device of claim 1 wherein said U-shaped limb support comprises a rigid core being substantially covered by a cushioning member for contact with said tree limb.

3. The device of claim 1 wherein said telescoping pole comprises first and second members, said first member being slidably received within said second member and said coupling comprising a locking collar for fixing the length of said telescoping pole along said longitudinal axis.

* * * * *